United States Patent
Chen et al.

(10) Patent No.: US 11,734,956 B2
(45) Date of Patent: Aug. 22, 2023

(54) PROCESSING CIRCUIT AND PROCESSING METHOD APPLIED TO FACE RECOGNITION SYSTEM

(71) Applicant: Realtek Semiconductor Corp., HsinChu (TW)

(72) Inventors: Chien-Hao Chen, HsinChu (TW); Chao-Hsun Yang, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 68 days.

(21) Appl. No.: 17/523,930

(22) Filed: Nov. 11, 2021

(65) Prior Publication Data
US 2022/0318543 A1 Oct. 6, 2022

(30) Foreign Application Priority Data
Mar. 31, 2021 (TW) ................................. 110111823

(51) Int. Cl.
*G06K 9/62* (2022.01)
*G06V 40/16* (2022.01)
*G06F 18/22* (2023.01)
*G06V 10/74* (2022.01)

(52) U.S. Cl.
CPC ............ *G06V 40/172* (2022.01); *G06F 18/22* (2023.01); *G06V 10/761* (2022.01)

(58) Field of Classification Search
CPC .................. G06V 40/16–40/179; G06V 40/50
See application file for complete search history.

(56) References Cited

U.S. PATENT DOCUMENTS

| | | | |
|---|---|---|---|
| 7,239,725 B2* | 7/2007 | Dobashi | G06V 40/16 235/382 |
| 7,991,204 B2* | 8/2011 | Monden | G06F 18/2415 382/124 |
| 2022/0164426 A1* | 5/2022 | Mequanint | G06V 40/50 |

FOREIGN PATENT DOCUMENTS

CN 111814570 A 10/2020

OTHER PUBLICATIONS

Hsin-Rung Chou, Jia-Hong Lee, Yi-Ming Chan, and Chu-Song Chen, "Data-specific Adaptive Threshold for Face Recognition and Authentication", CVPR paper, 4 pages, CVPR published in U.S.A., Oct. 26, 2018.

* cited by examiner

*Primary Examiner* — Brian Werner
(74) *Attorney, Agent, or Firm* — Winston Hsu

(57) ABSTRACT

The present invention provides a processing circuit applied to a face recognition system, which includes a characteristic value calculation module, a determination circuit and a threshold value calculation module. The characteristic value calculation module is used to receive an image and process the image to generate a specific characteristic value; when the face recognition system operates in a face recognition phase, the determination circuit calculates multiple differences each between the specific characteristic value and one of multiple reference characteristic values, and determines whether at least one of the multiple differences is lower than a threshold value to generate a determination result; and when the face recognition system operates in a face registration phase, the threshold value calculation module determines a new threshold value according to differences between the specific characteristic value and the multiple reference values, for updating the threshold value used by the determination circuit.

8 Claims, 5 Drawing Sheets

PROCESSING CIRCUIT AND PROCESSING METHOD APPLIED TO FACE RECOGNITION SYSTEM

BACKGROUND OF THE INVENTION

1. Field of the Invention

The present invention relates to a face recognition system, and more particularly, to a processing circuit and a processing method applied to a face recognition system.

2. Description of the Prior Art

In the current face recognition system, deep learning or neural network is used to analyze and process images, and the facial feature information in the database is compared to perform the face recognition. The operation of the face recognition system comprises two parts, which are the face registration and the face recognition. The operation of face registration is mainly to create an identity of a user and corresponding facial features in the database. Specifically, the face recognition system can take a picture of a user who needs to log in with a face image and input the face image into the deep learning model, and the deep learning model outputs a vector as the face feature of the face image, and then stores the vector and the identity of the user into the database. In addition, regarding face recognition, when the face recognition system takes a picture of a face of the user, the face image is input into the deep learning model to generate a vector, and the face recognition system compares the vector with multiple reference vectors in the database, to identify the identity of the user with the current face image captured by the face recognition system. In the face image database comparison, the face recognition system respectively calculates the distances between the vector generated by the deep learning model and multiple reference vectors in the database. If the distance between the vector and one reference vector is smaller than a threshold value, it is determined that the current face image captured by the face recognition system corresponds to the user identity associated with the reference vector; and if the distance between the vector and each reference vector is greater than the threshold value, it is determined that the current face image captured by the face recognition system corresponds to an unknown identity.

In the above-mentioned face image database comparison, the threshold value is manually predetermined, and the level of the threshold value has a great influence on the reliability and convenience of the face recognition system. Specifically, if the threshold value is defined more stringently, for example, by lowering the threshold value, the probability of false positive identification during face recognition may be reduced, but the probability of false negative identification is increased. The false positive identification refers to the fact that the face recognition system misidentifies a person B as an identity A, and the false negative identification refers to the fact that the face recognition system cannot identify a person A as the identity A (because the current face image of person A is different from the original face image recorded by face registration). On the other hand, if the threshold value is defined more loosely, for example, by increasing the threshold value, the probability of false positive identification can be reduced, but the probability of false negative identification is increased. Therefore, setting the threshold value is troublesome for the skilled person.

On the other hand, changes in the number of character identities in the database and the difference in reference vectors caused by the change of character identities will affect the performance of vector comparison using the face database.

SUMMARY OF THE INVENTION

One of the objectives of the present invention is to provide a method that can automatically adjust the threshold value, to solve the aforementioned problem.

At least one embodiment of the present invention provides a processing circuit applied to a face recognition system. The processing circuit comprises a characteristic value calculation module, a determination circuit and a threshold value calculation module. The characteristic value calculation module is configured to receive an image and process the image to generate a specific characteristic value. The determination circuit is coupled to the characteristic value calculation module. When the face recognition system operates in a face recognition phase, the determination circuit calculates multiple differences each between the specific characteristic value and one of multiple reference characteristic values, and determines whether at least one of the multiple differences is lower than a threshold value to generate a determination result. The threshold value calculation module is coupled to the characteristic value calculation module. When the face recognition system operates in a face registration phase, the threshold value calculation module determines a new threshold value according to differences between the specific characteristic value and the multiple reference characteristic values, for updating the threshold value used by the determination circuit.

At least one embodiment of the present invention provides a processing method applied to a face recognition system. The processing method comprises: receiving an image and processing the image to generate a specific characteristic value; when the face recognition system operating in a face recognition phase, calculating multiple differences each between the specific characteristic value and one of multiple reference characteristic values, and determining whether at least one of the multiple differences is lower than a threshold value to generate a determination result; and when the face recognition system operating in a face registration phase, determining a new threshold value according to differences between the specific characteristic value and the multiple reference characteristic values, for updating the threshold value used by the determination circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
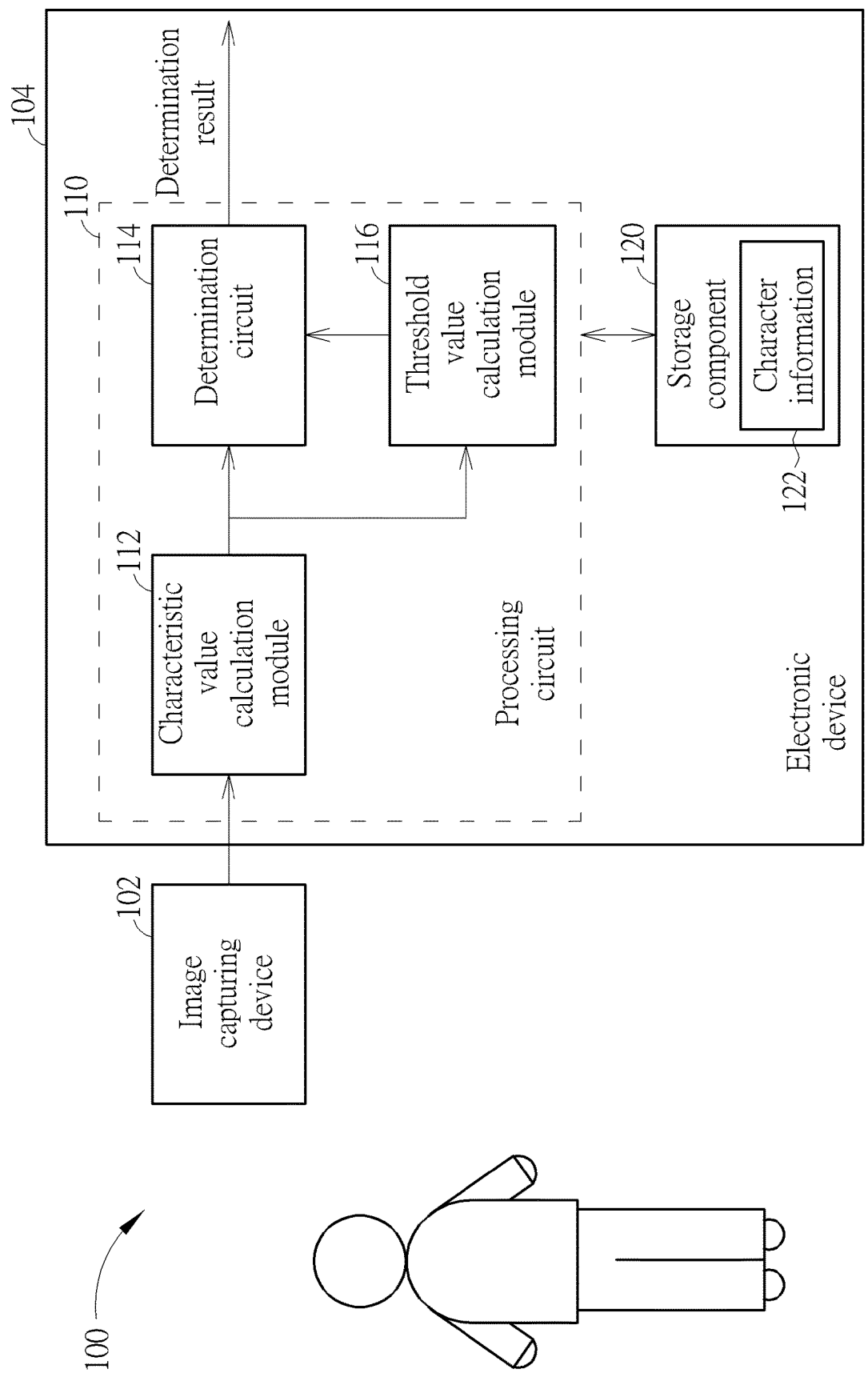
FIG. 1 is a diagram illustrating a face recognition system according to an embodiment of the present invention.

FIG. 1 is a diagram illustrating a face recognition system 100 according to an embodiment of the present invention. As shown in FIG. 1, the face recognition system 100 includes an image capturing device 102 and an electronic device 104. In the present embodiment, the image capturing device 102 may be a camera, a video recorder or any device that can capture a single image or successive images. The electronic device 104 can be any electronic device with an image recognition function, such as a dedicated image recognition device with a specific hardware circuit or a computer host/server with specific software installed to have the image recognition function. In the present embodiment, the face recognition system 100 may be applied to places that require identification of multiple persons. For example, the face recognition system 100 may be applied to places where personnel identity control is required at the entrance and exit, including a residential community, a building, a company, a laboratory, etc. In addition, the image capturing device 102 is arranged outside the electronic device 104 as illustrated in FIG. 1, but the present invention is not limited thereto. In other embodiments, the image capturing device 102 may be arranged in the electronic device 104.

The electronic device 104 includes a processing circuit 110 and a storage component 120, wherein the processing circuit 110 includes a characteristic value calculation module 112, a determination circuit 114 and a threshold value calculation module 116, and the storage component 120 includes character information 122, where the character information 122 includes multiple identities and corresponding reference characteristic values. The operation of the face recognition system 100 includes two parts, which are the face registration phase and the face recognition phase. The operation in the face registration phase is mainly to establish an identity of a person and corresponding characteristic value in the storage component 120, and the operation in the face recognition phase is to determine whether the characteristic value of the image captured by the image capturing device 102 matches the characteristic value in the storage component 120, to determine the identity of the person in the image captured by the image capturing device 102. As described in the prior art, the threshold value used in the process of face recognition has a great influence on the reliability and convenience of the face recognition system. Therefore, the present embodiment provides a threshold value adjustment method. The method can determine a new threshold value according to the characteristic value of the image captured by the image capturing device 102 and the reference characteristic value in the storage component 120 during the face registration phase, to update the current threshold value for subsequent use in the face recognition phase. As a result, the threshold value can be automatically adjusted to an appropriate level with only a small increase of the burden of the system, so as to achieve a balance between false positive identification and false negative identification of the face recognition system 100.

Figure 2:
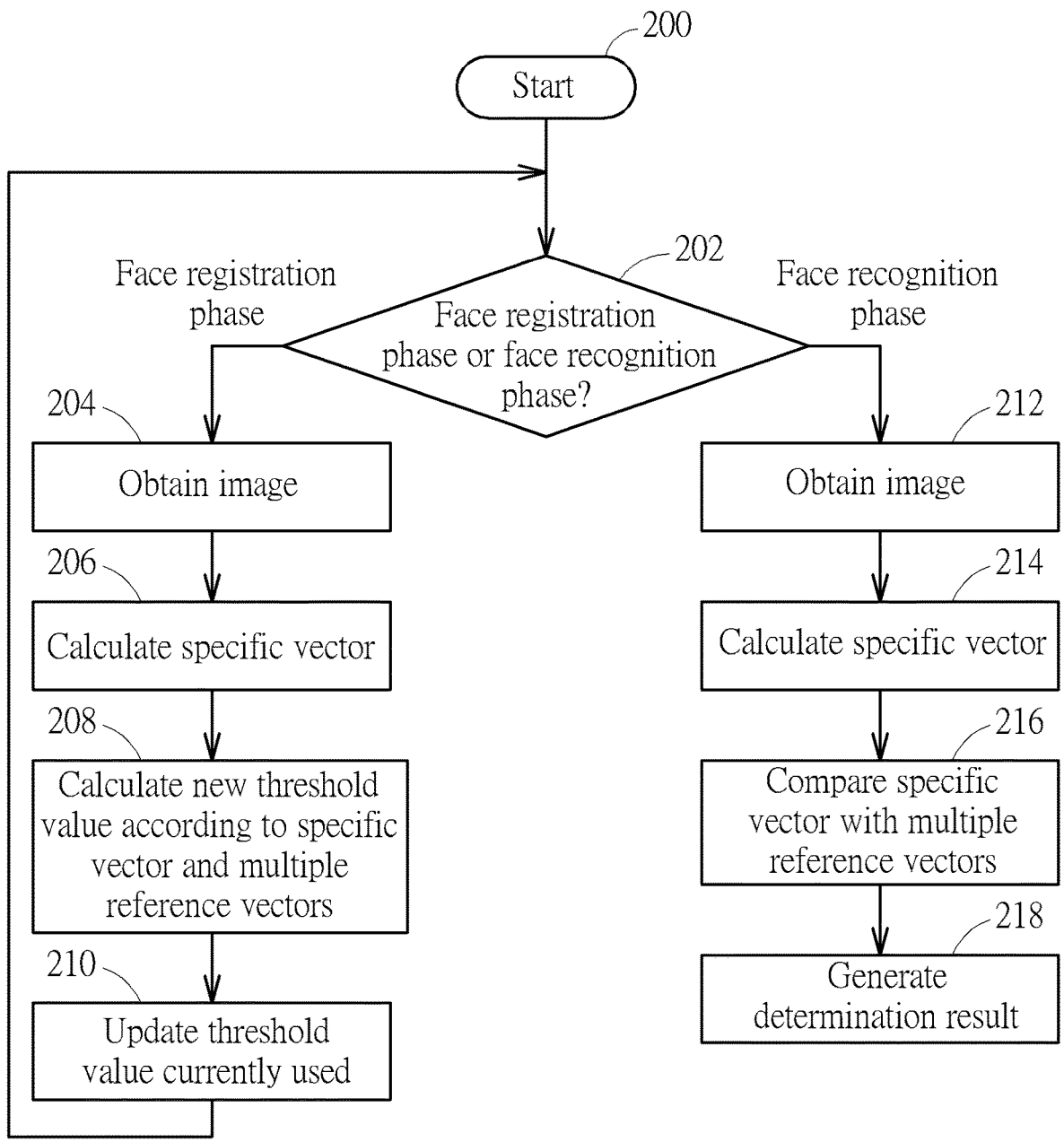
FIG. 2 is a flowchart illustrating an operation method of the face recognition system.

Specifically, please refer to FIG. 2 showing the flowchart of the operation method of the face recognition system 100. In step 200, the flow starts, and the face recognition system 100 is powered on and starts to operate. In step 202, the processing circuit 110 determines whether the face recognition system 100 is in the face registration phase or the face recognition phase. If the face recognition system 100 is in the face registration phase, the flow proceeds with step 204; if the face recognition system 100 is in the face recognition phase, the flow proceeds with step 212. In the present embodiment, distinguishing between the face registration phase and the face recognition phase is based on a user input command. For example, an administrator of the face recognition system 100 can control the electronic device 104 to enter the face registration phase.

In step 204, the processing circuit 112 of the electronic device 110 obtains an image, where the image may be a person's image captured by the image capturing device 102, or an image containing a person that is obtained from other sources. In step 206, the characteristic value calculation module 112 uses a deep learning based means or a neural network based means to process the image. For example, the characteristic value calculation module 112 performs multiple convolution operations on the image data to obtain a specific characteristic value, where the specific characteristic value can be represented as a multi-dimensional vector, such as a vector with a dimension of '512'. For simplicity, in the following description, the term "vector" is used to represent "characteristic value", such that the characteristic value calculation module 112 generates a specific vector, and the character information 122 in the storage component 120 includes multiple identities and corresponding reference vectors. It should be noted that, since generating the characteristic value of an image through the deep learning based means or neural network based means is known to those skilled in the art, further description is omitted here for simplicity.

In the face registration phase, the specific vector and the corresponding identity calculated in step 206 are written to the storage component 120 as a part of the character information 122.

Figure 3:
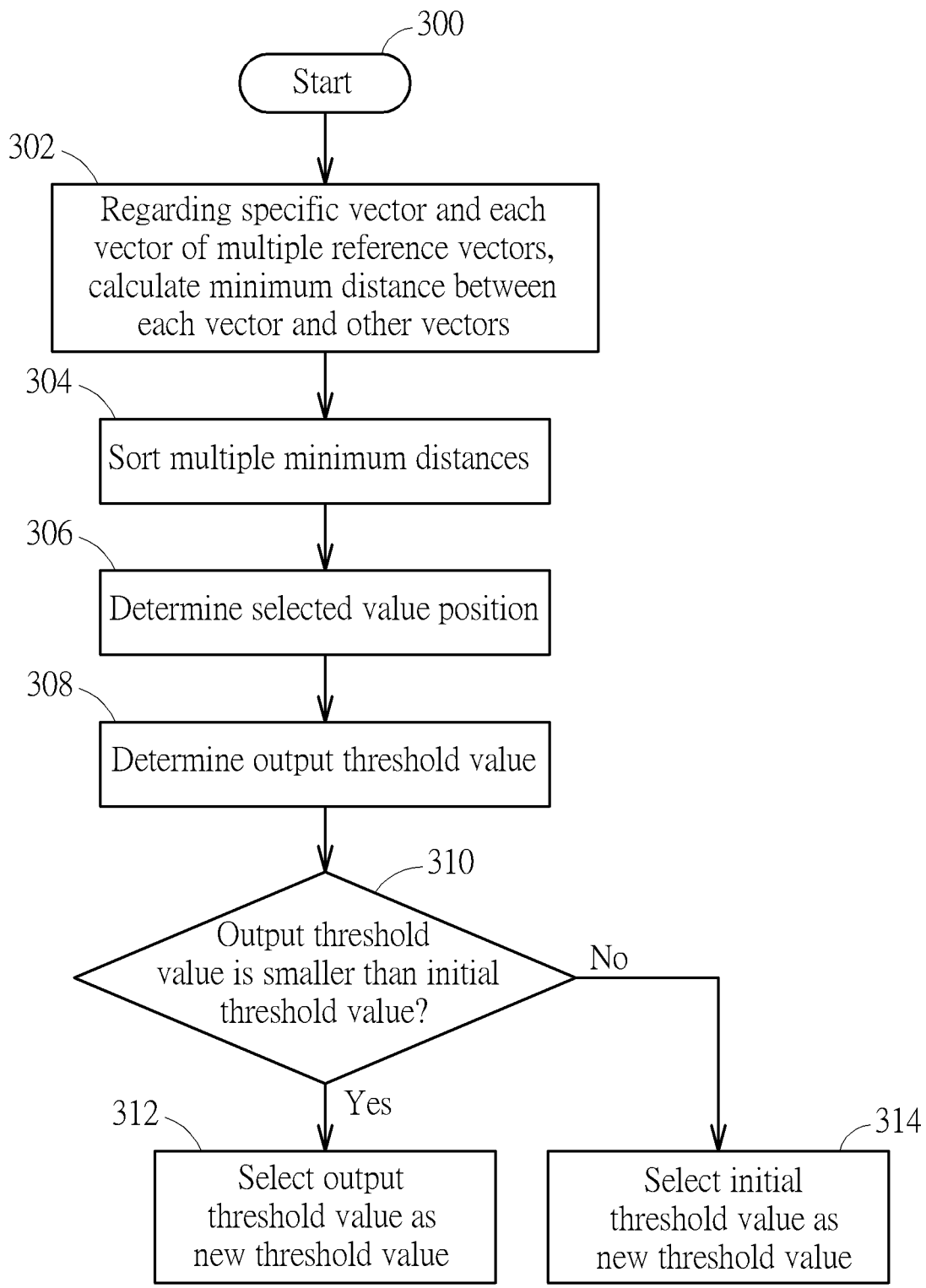
FIG. 3 is a flowchart illustrating a flow of determining a new threshold value according to an embodiment of the present invention.

In step 208, the threshold value calculation module 116 receives the specific vector generated from the characteristic value calculation module 112 and reads multiple reference vectors included in the character information 122 from the storage component 120, to calculate a new threshold value. Specifically, please refer to FIG. 3 showing the flowchart of determining a new threshold value according to an embodiment of the present invention. In step 300, the flow starts. In step 304, regarding each vector among the specific vector generated by the characteristic value calculation module 112 and the multiple reference vectors included in the character information 122, a minimum distance between each vector and other vectors is calculated. For example, referring to FIG. 4, assuming that the character information 122 includes N reference vectors each corresponding to an identity of a person, the threshold value calculation module 116 first calculates the difference (e.g. an Euclidean distance (L2 norm)) between the specific vector and each of the N reference vectors, in order to respectively generate N vector distances, and then selects one minimum value of the N vector distances as a minimum distance corresponding to the specific vector; the threshold value calculation module 116 calculates the distance between the reference vector #1 and each of the specific vector and remaining reference vectors #1-#N, in order to respectively generate N vector distances, and then selects one minimum value of the N vector distances as a minimum distance corresponding to the reference vector #1; and then the threshold value calculation module 116 calculates the distance between the reference vector #2 and each of the specific vector and remaining reference vectors #1 & #3-#N, in order to respectively generate N vector distances, and then selects one minimum value of the N vector distances as a minimum distance corresponding to the reference vector #2. Similarly, the threshold value calculation module 116 sequentially calculates the minimum distances respectively corresponding to the reference vector #3 to the reference vector N.

Figure 4:
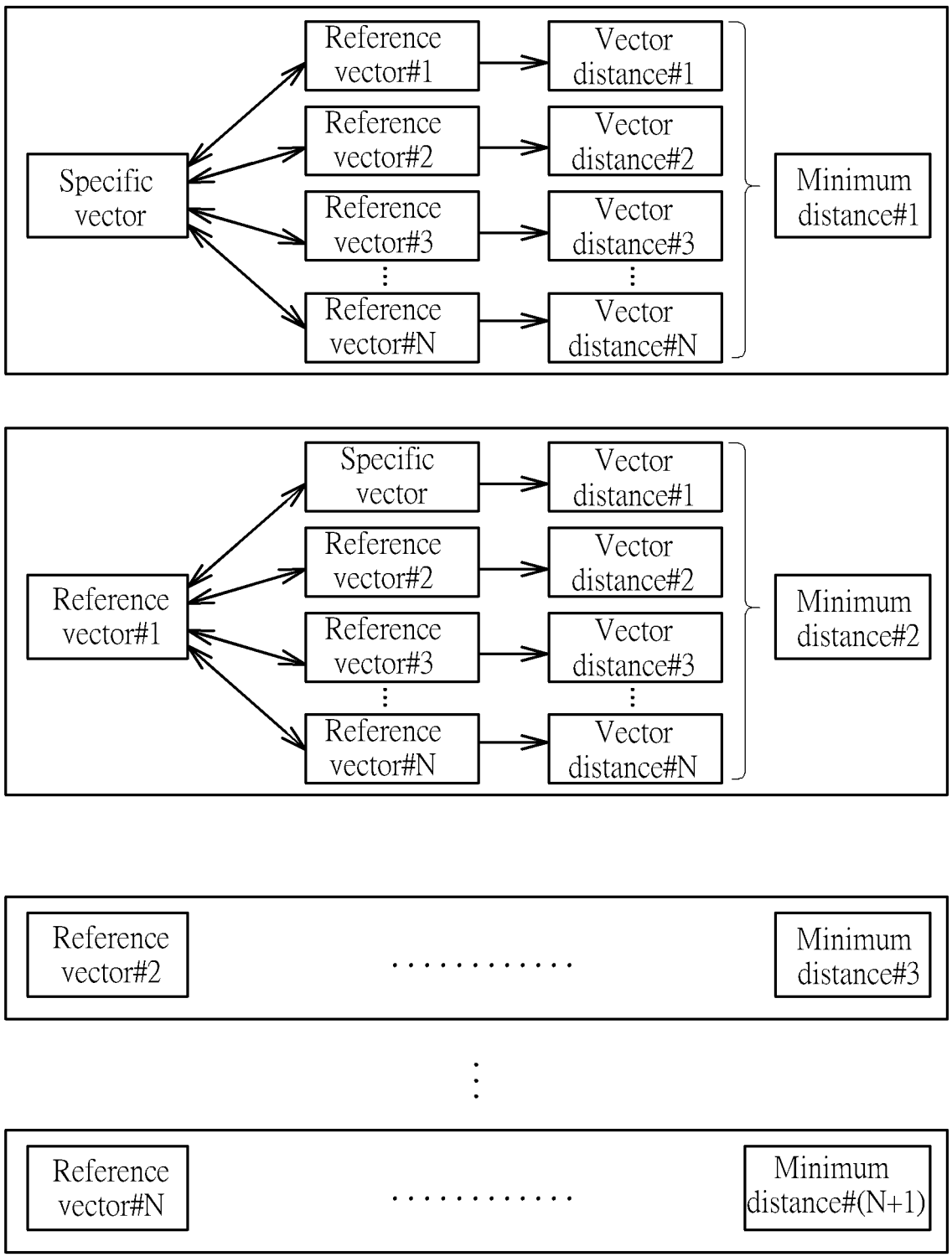
FIG. 4 is a diagram illustrating minimum distances being determined between a specific vector and each of multiple reference vectors.

It should be noted that in the embodiment in FIG. 4, it is assumed that there is only one reference vector for each character identity. However, in some other embodiments, each character identity can have multiple reference vectors, and the characteristic value calculation module 112 can generate multiple specific vectors during the face registration phase. In the situation that each character identity has multiple reference vectors, the distances between each vector of the multiple specific vectors and the multiple reference vectors and all remaining vectors of the multiple specific vectors and the multiple reference vectors still have to be calculated, in order to determine a minimum distance for each vector of the multiple specific vectors and the multiple reference vectors.

Figure 5:
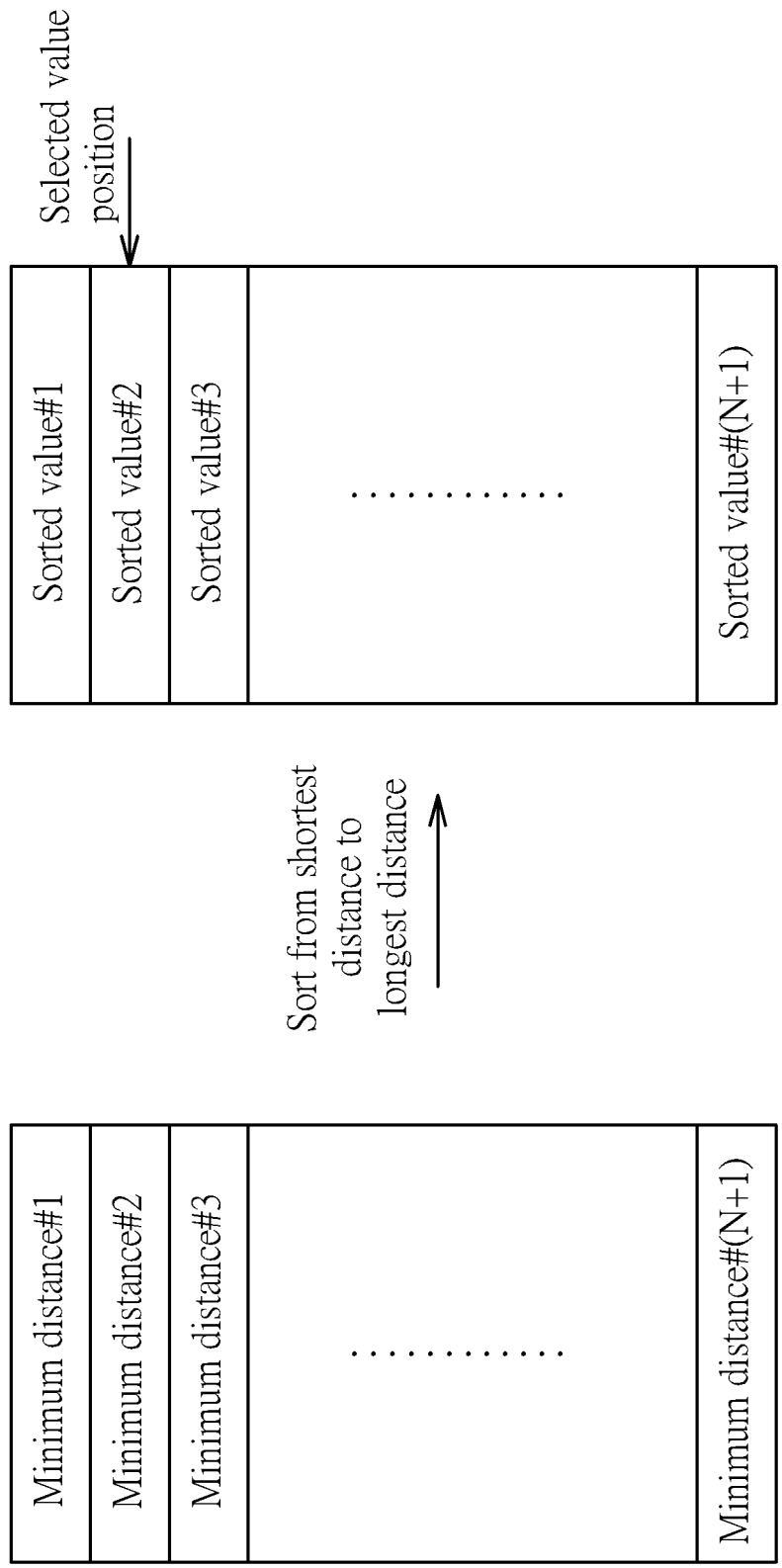
FIG. 5 is a diagram illustrating the multiple minimum distances being sorted to provide options for being selected.

In step 304, the threshold value calculation module 116 sorts the multiple minimum distances calculated in step 302, for example, in an ascending order from a shortest distance to a longest distance or a descending order from a longest distance to a shortest distance. In step 306, the threshold value calculation module 116 selects one of the sorted minimum distances according to a requirement setting. For example, referring to FIG. 5, the minimum distance #1 to minimum distance #(N+1) can be sorted from a shortest distance to a longest distance to generate a sorted value #1 to a sorted value #(N+1) from a smallest value to a largest value, and then one sorted value is selected according to the requirement setting such as a position corresponding to one percent of sorted minimum distances (if there are 100 sorted values, the sorted value #1, being the smallest value, is selected), or a position corresponding to two percent of sorted minimum distances (if there are 100 sorted values, the sorted value #2, being the second smallest value, is selected), or any other position correspond to a specific ratio of sorted minimum distances, such that a sorted value (hereinafter referred to as the selected minimum distance) is selected.

In step 308, the threshold value calculation module 116 generates an output threshold value according to the selected minimum distance. For example, the threshold value calculation module 116 directly uses the selected minimum distance as the output threshold value, or generates the output threshold value by performing some calculations upon the selected minimum distance.

In step 310, the threshold value calculation module 116 determines whether the output threshold value is smaller than an initial threshold value. If yes, the flow proceeds to step 312; if no, the flow proceeds to step 314. In step 312, the threshold value calculation module 116 selects the output threshold value as the new threshold value. In step 314, the threshold value calculation module 116 selects the initial threshold value as the new threshold value.

The reason for comparing the output threshold value (e.g., selected minimum distance) with the initial threshold value in step 310 is to prevent the output threshold value from being too large due to a too small number of reference vectors included in the character information 122, where the problem of false positive identification may occur due to the output threshold value being too large.

Then, the flow returns to step 210. The threshold value calculation module 116 uses the new threshold value to update the threshold value currently used by the determination circuit 114, and then the flow returns to step 202.

Regarding the face recognition phase, in step 212, the processing circuit 112 of the electronic device 110 obtains an image, where the image is a captured image generated by the image capturing device 102 taking a photo of a person. In step 214, the characteristic value calculation module 112 uses the deep learning based means or neural network based means to process the image. For example, the characteristic value calculation module 112 performs multiple convolution operations on the image data to obtain a specific vector. In step 216, the determination circuit 114 reads multiple reference vectors included in the character information 122 from the storage component 120, and calculates a plurality of vector distances each between the specific vector and one of the reference vectors. If a vector distance among the vector distances is smaller than the threshold value, it is determined that the image of person captured by the image capturing device 102 corresponds to the identity of a reference vector with the vector distance, and the determination result is output in step 218. It should be noted that if there are two or more vector distances smaller than the threshold value, it can be determined that the image of person captured by the image capturing device 102 corresponds to the identity of a reference vector with the smallest vector distance among the vector distances, and the determination result is output in step 218. On the other hand, if there is no vector distance smaller than the threshold value, it is determined that the image of person captured by the image capturing device 102 having an unknown identity, and the determination result is output in step 218.

In the above embodiments of the present invention, the threshold value used by the determination circuit 114 is automatically adjusted to an appropriate value in each face registration phase and then used in the subsequent face recognition phase. Therefore, the problem of having difficulty in setting the threshold value in the prior art can be effectively solved. In addition, since the above threshold adjustment operation is only performed during the face registration phase, it will not cause much burden on the face recognition system 100. In addition, the determination circuit 114 in the present embodiment uses a single threshold value to perform face recognition, in order to reduce the system complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing circuit applied to a face recognition system, comprising:
   a characteristic value calculation module circuit, configured to receive an image and process the image to generate a specific characteristic value;
   a determination circuit, coupled to the characteristic value calculation module circuit, wherein when the face recognition system operates in a face recognition phase, the determination circuit calculates multiple differences each between the specific characteristic value and one of multiple reference characteristic values, and determines whether at least one of the multiple differences is lower than a threshold value to generate a determination result; and
   a threshold value calculation module circuit, coupled to the characteristic value calculation module circuit, wherein when the face recognition system operates in a face registration phase, the threshold value calculation module circuit determines a new threshold value according to differences between the specific characteristic value and the multiple reference characteristic values, for updating the threshold value used by the determination circuit;

wherein regarding each characteristic value among the specific characteristic value and the multiple reference characteristic values, the threshold value calculation module circuit calculates a minimum distance between said each characteristic value and other characteristic values, and determines the new threshold value according to multiple minimum distances corresponding to the specific characteristic value and the multiple reference characteristic values respectively, for updating the threshold value used by the determination circuit;

wherein the threshold value calculation module circuit sorts the multiple minimum distances and selects one minimum distance from the multiple minimum distances according to a requirement setting; and the threshold value calculation module circuit calculates an output threshold value according to the selected one minimum distance, for determining the new threshold value;

wherein the threshold value calculation module circuit determines whether the output threshold value is greater than an initial threshold value, and if the output threshold value is smaller than the initial threshold value, the threshold value calculation module circuit determines the new threshold value according to the output threshold value; and if the output threshold value is not smaller than the initial threshold value, the threshold value calculation module circuit determines the new threshold value according to the initial threshold value.

2. The processing circuit of claim 1, wherein the threshold value calculation module circuit generates the new threshold value only when the face recognition system operates in the face registration phase, in order to update the threshold value used in the determination circuit.

3. The processing circuit of claim 1, wherein the determination circuit uses only a single threshold value to perform determination on whether at least one of the multiple differences is lower than the threshold value, for generating the determination result.

4. The processing circuit of claim 1, wherein the requirement setting is a position corresponding to a specific ratio or a specific percentage of the multiple minimum distances.

5. A processing method applied to a face recognition system, comprising:
receiving an image and processing the image to generate a specific characteristic value;
when the face recognition system operating in a face registration phase, determining a new threshold value according to differences between the specific characteristic value and multiple reference characteristic values, for updating a threshold value used in a face recognition phase, wherein the threshold value is used to be compared with multiple differences between another specific characteristic value and the multiple reference characteristic values to generate a determination result;

wherein the step of determining the new threshold value according to the differences between the specific characteristic value and the multiple reference characteristic values comprises:
regarding each characteristic value among the specific characteristic value and the multiple reference characteristic values, calculating a minimum distance between said each characteristic value and other characteristic values; and
determining the new threshold value according to multiple minimum distances corresponding to the specific characteristic value and the multiple reference characteristic values respectively, for updating the threshold value;

wherein the step of determining the new threshold value according to the multiple minimum distances corresponding to the specific characteristic value and the multiple reference characteristic values respectively comprises:
sorting the multiple minimum distances;
selecting one minimum distance from the multiple minimum distances according to a requirement setting; and
calculating an output threshold value according to the selected one minimum distance for determining the new threshold value;

wherein the step of calculating the output threshold value according to the selected one minimum distance for determining the new threshold value comprises:
determining whether the output threshold value is greater than an initial threshold value;
if the output threshold value is smaller than the initial threshold value, determining the new threshold value according to the output threshold value; and
if the output threshold value is not smaller than the initial threshold value, determining the new threshold value according to the initial threshold value.

6. The processing method of claim 5, wherein the step of determining the new threshold value according to the differences between the specific characteristic value and the multiple reference characteristic values is performed only when the face recognition system operates in the face registration phase.

7. The processing method of claim 5, wherein when the face recognition system operating in the face recognition phase, only a single threshold value is used to perform determination on whether at least one of the multiple differences is lower than the threshold value, for generating the determination result.

8. The processing method of claim 5, wherein the requirement setting is a position corresponding to a specific ratio or a specific percentage of multiple minimum distances.

* * * * *